May 3, 1949.    A. RICKENMANN    2,469,077
MACHINE TOOL WITH AUTOMATIC FEED DEVICE
Filed July 31, 1947    4 Sheets-Sheet 1

Inventor:
Alfred Rickenmann
by Singer, Ehlert, Stern
& Carlberg, Attorneys.

May 3, 1949.  A. RICKENMANN  2,469,077

MACHINE TOOL WITH AUTOMATIC FEED DEVICE

Filed July 31, 1947  4 Sheets-Sheet 3

Inventor:
Alfred Rickenmann,
by Singer, Ehlert, Stern & Carlberg,
Attorneys.

May 3, 1949.  A. RICKENMANN  2,469,077
MACHINE TOOL WITH AUTOMATIC FEED DEVICE
Filed July 31, 1947  4 Sheets-Sheet 4
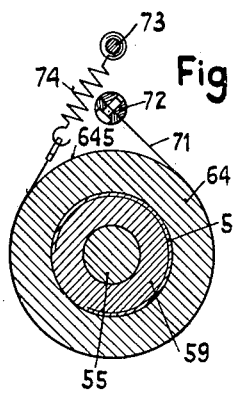
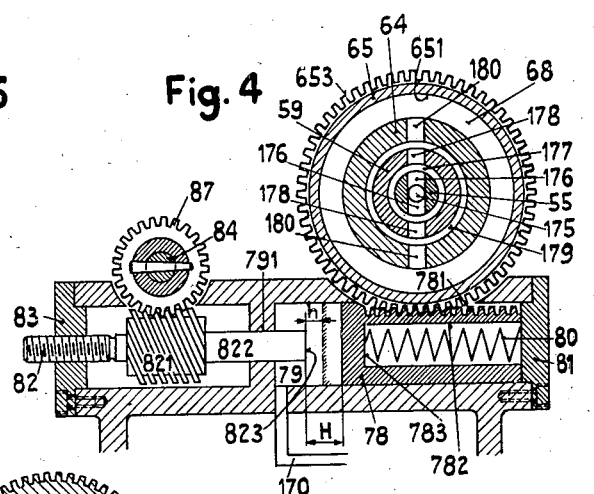
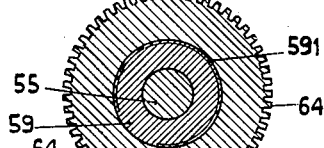
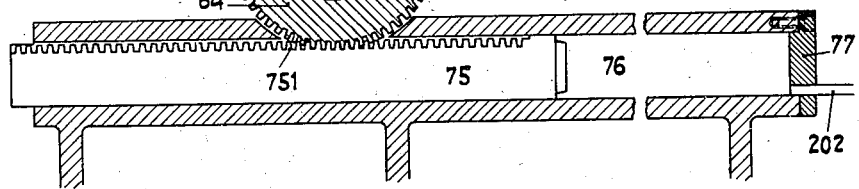
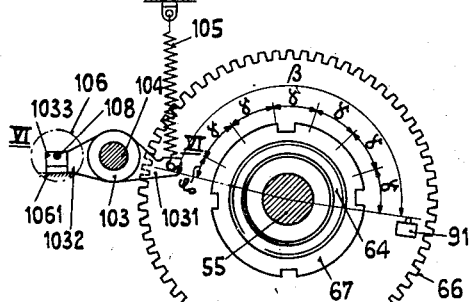
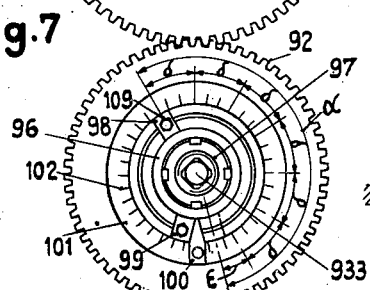
Inventor:
Alfred Rickenmann,
by Singer, Ehlert, Stern & Carlberg,
Attorneys.

Patented May 3, 1949

2,469,077

UNITED STATES PATENT OFFICE 2,469,077

MACHINE TOOL WITH AUTOMATIC FEED DEVICE

Alfred Rickenmann, Kusnacht, near Zurich, Switzerland

Application July 31, 1947, Serial No. 765,062

14 Claims. (Cl. 51—95)

The invention relates to a machine tool, and particularly is directed to an automatic feed device for advancing the tool one step of predetermined distance toward the workpiece prior to each working pass of the latter and finally for the last and final pass advancing the tool a distance which is automatically limited to such an amount that the tool finishes the workpiece accurately to the desired size.

It is one of the more important objects of the invention to provide a machine tool with an automatic feed device in which the total amount of feed of the tool is manually adjustable and may be subdivided into a number of individual feeding steps of which the first few may be uniform or when only two feeding steps are required the first one may be greater than the last one. At any rate the last feeding step which is usually smaller, but never larger than the preceding feeding step, is automatically adjusted during the operation of the machine tool to be of a size equal to the balance of the total amount of feed.

Another important object of the invention is a machine tool having a tool carriage provided with a manually rotatable feed spindle which is in threaded engagement with the tool carriage and which spindle has associated therewith an automatic feed device which prior to each workin pass of the workpiece moves the feed spindle, without rotating it, in axial direction toward the workpiece.

It is also an object of the invention to provide a machine tool of the type having a longitudinally movable workpiece carriage which is moved by a guide spindle along the machine bed back and forth and past a transversely adjustable tool carriage with an electrically controlled and hydraulically operated feed mechanism which latter is automatically actuated each time the workpiece carriage reaches one end of its travel. The automatically actuated feed mechanism is provided with electrical and hydraulic control means which are arranged and constructed in such a manner that the total amount of feed may be manually adjusted and may also be manually subdivided into a desired number of steps, each one of which is executed just prior to a working pass of the workpiece carriage past the tool carriage, whereby the last feed step is automatically adjusted to an amount equal to the balance of the total feed prior to the beginning of the last working travel of the workpiece carriage.

A further object of the invention is to provide the automatic feed device of the machine tool of the type just described with means for automatically returning the workpiece carriage to its starting position after the tool has performed its last and finishing operation on the workpiece, and then stopping the drive of the guide spindle. Means are also provided for returning the automatic feed device to its initial position so that the completed workpiece may be removed and another one inserted.

Another object of the invention is the combination of an automatic feed device with a conventional rotatable feed spindle which is in threaded engagement with the tool carriage of a machine tool. The automatic feed device includes an exteriorly threaded sleeve axially slidably supported in the machine frame and rotatably supporting therein the feed spindle and engaging with one of its ends a shoulder on the latter, an interiorly threaded sleeve which engages the thread on said first mentioned sleeve and has an annular shoulder adapted to be drivingly engaged by an end face of a feed gear when the latter during its rotation is urged by hydraulic pressure axially against said annular shoulder, so that the first mentioned sleeve and the feed spindle therein are moved axially in a direction toward the workpiece. The feed gear is actuated by a rack on a hydraulically operated piston whose movement is limited by a manually adjustable stop which determines the amount of feed of the tool carriage for each pass with the exception of the last one. The automatic device of the invention may be incorporated in machine tools of different types, but it is particularly adapted for grinding machines which are employed for producing cylindrical workpieces or threaded workpieces which have to be finished within very close tolerances.

It is, therefore, another object of the invention to provide a grinding machine, in fact, a screw thread grinding machine with an automatic feed device for the grinding tool thereof and which provides a cylindrical workpiece with a screw thread of predetermined size and profile in at least two passes, wherein prior to the last pass the feed of the grinding tool is accurately and automatically adjusted so that the thread is finished with an accuracy which will be within the permissible limits.

Other purposes of the invention will be apparent from or will be specifically pointed out in the drawing forming a part of this specification, but it is to be understood that the invention is not limited to the particular embodiment described and various forms may be adopted within the scope of the claims.

By way of example there is described and illustrated in the following disclosure and drawings a thread grinding machine embodying the several features of the invention.

Referring to the drawings:

Fig. 4 is a sectional view of the oil chamber of the control member, the feed piston and the feed limiting device, substantially on the line II—II of Fig. 3.

Fig. 5 is a sectional view of the brake associated with the feed device, substantially on the line III—III of Fig. 3.

Fig. 6 is a sectional view of the return mechanism substantially on the line IV—IV of Fig. 3.

Fig. 7 is an elevation view of the feed adjusting and limiting device, partly in section substantially on the line V—V of Fig. 3.

Fig. 8 is a sectional view of the feed limiting device, substantially on the line VI—VI of Fig. 7, and Fig. 9 is a sectional view of the manually operable adjusting mechanism for determining the individual feed steps of the automatic feed device, substantially on the line VII—VII of Fig. 2.

Figure 1:
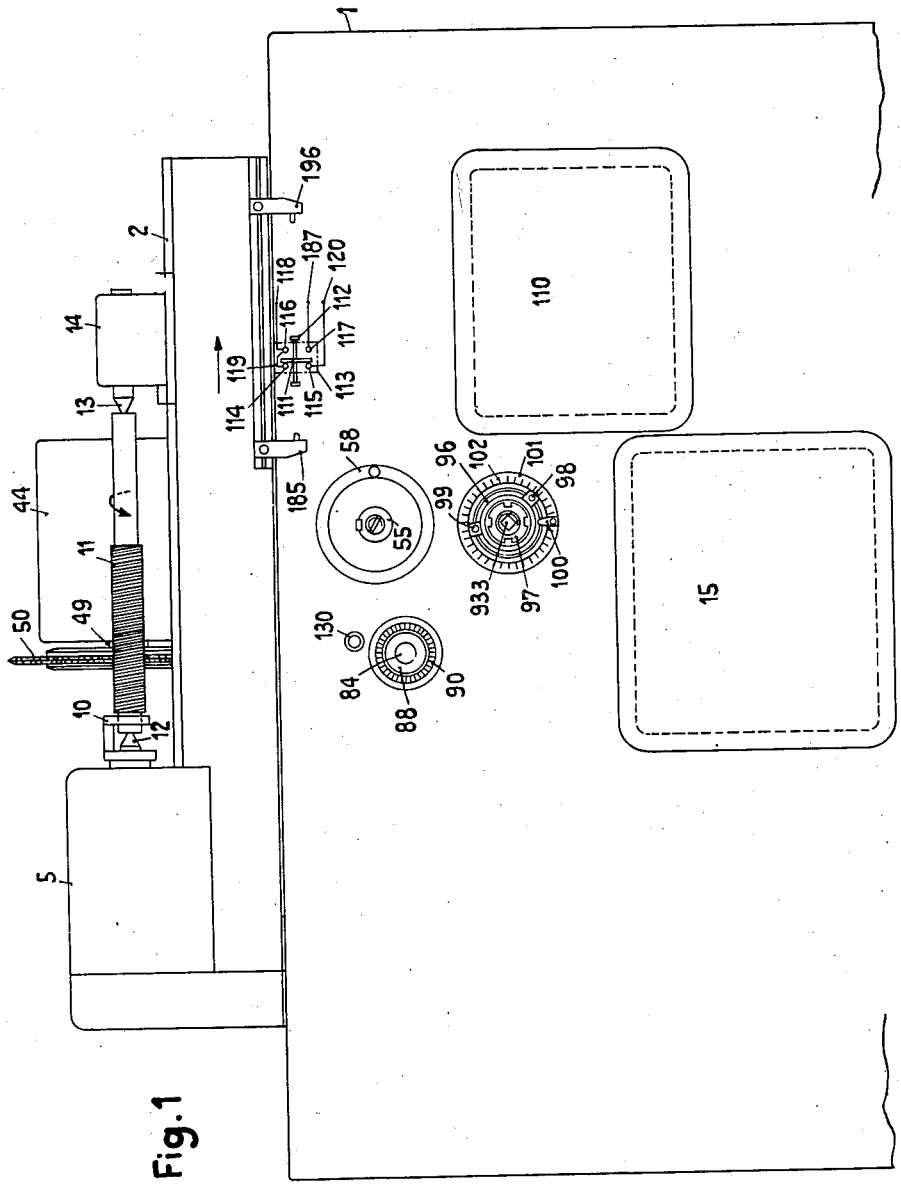
Fig. 1 is an elevation view of the machine tool for grinding threads.
Figure 2:
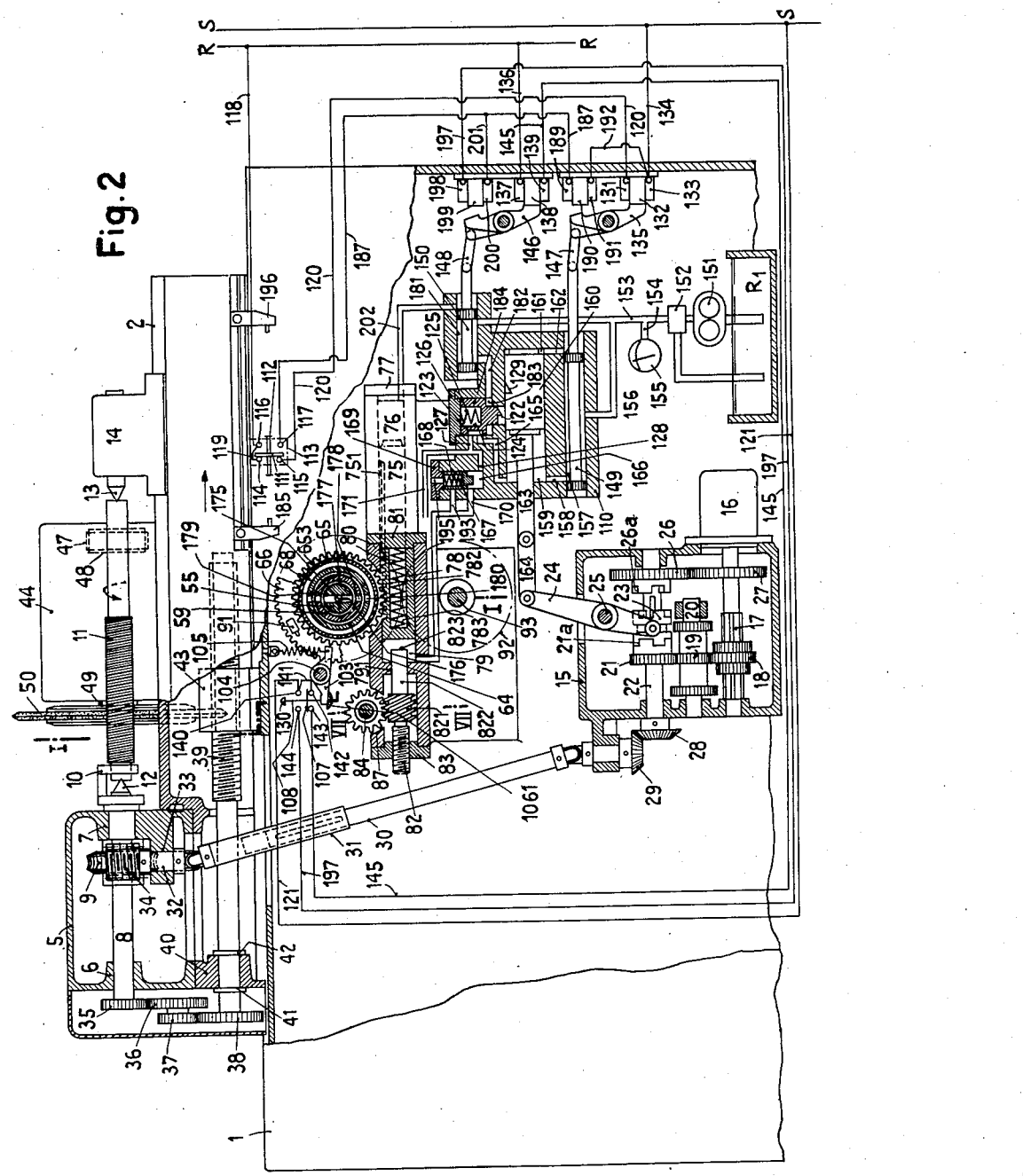
Fig. 2 is a longitudinal sectional view of the machine tool and discloses diagrammatically the electrical and hydraulic control devices.
Figure 3:
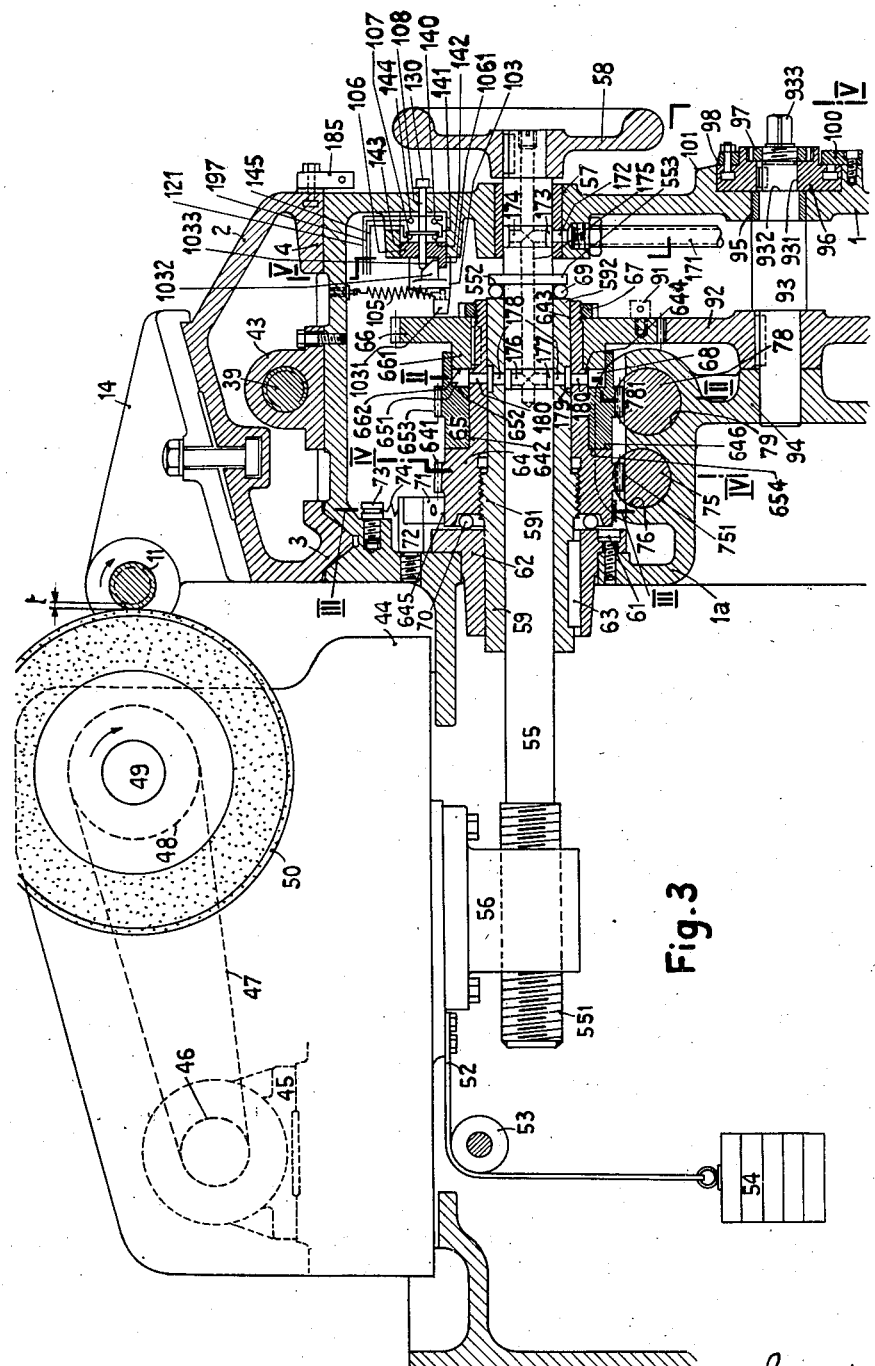
Fig. 3 is a cross sectional view of the upper portion of the machine tool substantially on the line I—I of Fig. 2.

Referring to the drawings, particularly Figs. 1, 2 and 3, the machine frame 1 supports slidably in longitudinal guides 3 and 4 a workpiece carriage 2 which has mounted thereon a head stock 5 provided with two spaced bearings 6 and 7 for supporting the work spindle 8. The latter carries a worm wheel 9 and a driver 10 for rotating the workpiece 11. The workpiece 11 is rotatably supported between centers, namely the center 12, which is attached to one end of the work spindle 8, and the center 13 of a tail stock 14 mounted on the carriage 2.

A gear box 15 is secured in the frame 1 of the machine tool and has attached thereto a flanged motor 16 which drives a shaft 17 extending into the gear box 15 and rotatably supported therein. The shaft 17 drives a set of change speed gears 18 which is axially slidable on shaft 17. Upon axial displacement of the gears 18 the same are adapted to selectively engage their respective companion gear in a set of integrally connected gears 19 mounted on a shaft 20. The center gear of the set of gears 19 is also in continuous driving engagement with a spur gear 21 rotatably mounted on a shaft 22. The shaft 22 carries rotatably thereon another spur gear 26. The gears 21 and 26 are mounted in axially spaced relation freely rotatable on the shaft 22 and the hubs of these gears face each other and are provided each with coupling teeth 21ª and 26ª respectively. A coupling sleeve 23 is mounted by means of a key axially movable on the shaft 22 between the two gears 21 and 26. Both ends of the coupling sleeve 23 have coupling teeth which are adapted to be brought selectively in engagement with the coupling teeth 21ª and 26ª on the gears 21 or 26. A control lever 24 is mounted between its ends rotatably on a stationary pin 25 within the gear box 15 and one end of this lever 24 is operatively connected to the coupling sleeve 23. When the lever 24 is moved into the position illustrated in Fig. 2 the coupling sleeve 23 engages coupling teeth 21ª of the gear 21 which latter is rotated by the change speed gearing 18, 19 so that the coupling sleeve 23 is rotated and drives the shaft 22. This position of the coupling sleeve 23 indicates the operative position of the machine tool in which the work spindle 8 is rotated in a direction in which the workpiece is engaged by the tool.

During the reverse rotation of the work spindle 8 the coupling sleeve 23 is in engagement with the coupling teeth 26ª on the gear 26. In the last named position the shaft 22 will be driven in the opposite direction by the gear 26 which meshes directly with a gear 27 mounted on shaft 17.

The shaft 22 drives by means of the bevel gears 28 and 29 a telescoping shaft 30, 31 which in turn drives a vertical shaft 32. The shaft 32 is rotatably supported in a bearing 33 of the head stock 5 and has mounted thereon a worm 34 which meshes with the worm wheel 9 attached to the work spindle 8.

The rear end of the work spindle 8 has keyed thereto a spur gear 35 which drives the gears 36, 37 and 38 which last named gear is mounted on the rear end of the guide spindle 39 of the machine. The four gears 35, 36, 37 and 38 are mounted in such a manner so as to be readily exchangeable and the ratio of the same in each case is selected according to the pitch of the thread which is to be ground on the workpiece. The guide spindle 39 is rotatably mounted in a bearing 40 of the carriage 2 and has collars 41 and 42 attached thereto which engage opposite end faces of the bearing 40 and thereby prevent a relative axial movement of the guide spindle 39 with respect to the carriage 2. The threaded portion of the guide spindle 39 is in threaded engagement with a guide spindle nut 43 which is fixedly attached to the frame 1 of the machine.

A tool carriage 44 is slidably mounted in two guideways which are not shown but which extend at right angles to the guideways 3 and 4 of the workpiece carriage 2. The tool carriage 44 has mounted thereon a motor 45, Fig. 3, which by means of a small pulley 46 and the belt 47 drives a larger pulley 48 mounted on one end of a grinding wheel spindle 49. The other end of the spindle 49 has mounted thereon a grinding disc 50.

The tool carriage 44, Fig. 3, has attached thereto a flexible tape 52 which is guided over a guide roller 53 and carries a weight 54. The arrangement is such that the weight 54 urges the tool carriage 44 continuously rearwardly and away from the workpiece 11 on the workpiece carriage 2.

The tool carriage 44 is operated by a feed spindle 55 having a threaded portion 55¹ in engagement with a nut 56 mounted on the tool carriage 44. The feed spindle 55 is rotatably supported near its outer end by a bearing 57 in the machine frame 1 and also by a sleeve 59 which surrounds the feed spindle 55 between its ends. The outer end of the feed spindle 55, which projects from the front side of the machine frame, has keyed thereto a handwheel 58. The sleeve 59 is provided on a somewhat enlarged portion of its outer circumference with a thread 59¹ and is longitudinally movably mounted in a flanged bearing 62 which is attached by screws 61 to a wall 1ª forming a portion of the machine frame 1. A key 63 prevents a rotative movement of the sleeve 59 within the bearing 62. A second sleeve 64 which in the following will be designated with "gear sleeve," because it has gear teeth 64¹ thereon is rotatably mounted on the sleeve 59 and is in threaded engagement with the thread 591 on the same. One end portion of the gear sleeve 64 is provided with exterior gear teeth 641. A reduced cylindrical portion 642 of the gear sleeve 64 supports rotatably a feed wheel 65 provided on its outer circumference with gear teeth 653. Another still more reduced cylindrical portion 643 of the gear sleeve 64 has keyed thereto a spur gear 66 which by means of a nut 67, screwed upon the outer end of the gear sleeve 64, is held in engagement with an annular shoulder 644 formed between the reduced cylindrical portions 642 and 643, Fig. 3.

The hub 661 of the spur gear 66 is accurately machined and extends closely fitting into the enlarged bore 651 at one end of the feed wheel 65. In this manner there is produced between the flat radial bottom 652 of the bore 651 and the flat radial end face 662 of the hub 661 an annular chamber 68 whose inner cylindrical surface is formed by a fraction of the outer circumference of the reduced sleeve portion 642 and by a portion of the wall of the bore 651.

Since the weight 54 urges the tool carriage 44 rearwardly it will be obvious that the feed spindle 55 also, which is in threaded engagement with the tool carriage 44, is urged continuously rearwardly. The feed spindle 55 has between the sleeve 59 and the bearing 57 an enlarged portion or a collar 553 whose end face 552 is urged against an axial bearing 69 arranged between the right hand end face 592 of the sleeve 59, Fig. 3, and the collar 553. The sleeve 59 transmits its axial movement by means of its threaded portion 591 to the gear sleeve 64 and to an axial bearing 70 which latter is supported by the flanged bearing 62. The cylindrical end portion 645 of the gear sleeve 64 is embraced by a brake band 71, Figs. 3 and 5. One end of this brake band 71 is attached to a bolt 72 and the other end of the brake band is attached to one end of a tension spring 74 having its other end attached to a bolt 73. The tension spring 74 maintains the brake band 71 in continuous engagement with the cylindrical portion 645 of the gear sleeve 64. The two bolts 72 and 73 are attached to a wall of the machine frame 1.

The gear teeth 641 of the gear sleeve 64 mesh with rack teeth 751 of a tool carriage return piston 75 which is reciprocably mounted in a cylinder 76 the right hand end of which is closed by a cover 77, Figs. 2 and 6.

The gear teeth 653 of the feed wheel 65 mesh with rack teeth 781, Figs. 2, 3 and 4, which are provided on a feed piston 78 mounted reciprocably in a cylinder 79 which is arranged parallel to the cylinder 76. The feed piston 78 is provided with an axial bore 782 in which is positioned a pressure spring 80 one end of which engages the bottom 783 of the bore 782 and the other end of which engages the cover 81 which closes the rear end of the cylinder 79. The spring 80 urges the feed piston 78 continuously toward the left, Figs. 2 and 4. The feed of the piston 78 as represented by the distance H constitutes one of the initial feed movements of the tool and this distance is determined by the position of an abutment screw 82 which is threaded in the cover 23 and carries a worm wheel 821 and has a smooth cylindrical extension 822 which is slidably mounted in a bore 791 arranged in the left hand end wall of the cylinder 79.

A manually operable adjusting mechanism is provided for adjusting the position of the abutment screw 82 and for changing the length of the feed movement H. This adjusting mechanism is arranged at right angles to the center axis of the abutment screw 82 and consists of a shaft 84, Figs. 1 to 4 and 9 journaled in bearing holes 85 and 86 provided in the machine frame 1, a worm wheel 87 in engagement with the worm wheel 821 and an adjusting knob 88 attached to the outer end of the shaft 84. A collar 89 on the shaft 84 and the adjusting knob 88 attached to the outer end of the shaft 84 prevent an axial movement of the latter.

The desired feed movement for each pass is obtained by adjusting the knob 88 which latter is provided with a scale 90. By rotating the knob 88 the shaft 84 effects a corresponding rotation of the worm gearing 87, 821 and therewith a rotative and axial movement of the abutment screw 82. When the abutment screw 82 is moved toward the left the feed movement of the piston 78 will be increased while an adjustment of the abutment screw 82 toward the right effects a decrease in the feed movement of the piston.

The spur gear 66, Figs. 2 and 3, which carries a stop 91, meshes with a spur gear 92 which is keyed to a shaft 93 rotatably mounted in spaced bearings 94 and 95 provided in the machine frame 1. A drum 96 is keyed to a reduced cylindrical portion 931 of the shaft 93 and is secured against axial movements by an annular nut 97 which urges the drum against an annular shoulder 932 on the shaft 93.

The drum 96, Figs. 3 and 7, carries two dogs 98 and 99, the first one of which is rigidly secured while the other dog 99 is slidably adjustably mounted in a circular T-shaped groove of the drum. A stop 100 is fixedly attached by a screw or the like to the machine frame 1.

An annular face 101 extends about the drum 96 and is provided with a scale 102, Fig. 7. The latter and the dogs 98 and 99 allow the adjustment and the limiting of the total distance $t$ Fig. 3 which the tool carriage 44 has to move and of the rotary movement which the drum 96 has to rotate in order to complete the grinding of one workpiece.

A double armed lever 103, Figs. 2, 7 and 8, is rotatably mounted on a pin 104 screwed into the wall of the machine frame. A tension spring 105 attached with one end to the lever arm 1031 and with its other end to a fixed point of the machine frame urges the other arm 1032 continuously in engagement with a projection 1061 on a ring 106 as long as the stop 91 does not engage the lever arm 1031.

The relative position and the ratio of the two spur gears 66 and 92 are so selected that when the dog 98 engages the right hand side of the stop 100 the stop 91 presses upon the arm 1031, whereby the inclined face 1033 on the arm 1032 urges the bridging contact 107 on the switch pin 108 against the two contact members 140 and 144.

Prior to the beginning of the grinding operation the total amount of feed $t$ of the tool is determined and by means of the scale 102 the automatic feed device is adjusted. For this purpose a crank or key is attached to the squared portion 933 of the shaft 93 and the latter with the drum 96 thereon is rotated in counter-clockwise direction until the line 109 on the fixedly attached dog 98 has been moved to a place on the scale 102 which corresponds to the desired total feed $t$. In this position the drum 96 has been rotated about the angle $\alpha$ and now the adjustable dog 99 is slidably adjusted until it engages the left hand side of the stop 100. In this position the dog 99 is clamped in position on the drum 96, Fig. 7. When the shaft 93 is rotated in the manner just described the two meshing gears 92 and 66 are rotated and since the gear 66 is keyed to the gear sleeve 64 the latter is also rotated. The stop 91 attached to one end face of the gear 66 is thereby moved about the angle $\beta$ away from its left hand end position, Fig. 7. The rotative movement of the gear sleeve 64, which is prevented from moving in axial direction, has the result that due to the left hand thread 59I the sleeve 59 is moved in axial direction rearwardly a distance corresponding to the amount of the total feed $t$ which was adjusted on the scale 182. At the same time, the weight 54 which acts on the feed spindle 55 and on the tool carriage 44 moves the spindle 55 and the tool carriage 44 the same amount rearwardly, that is, in a direction away from the workpiece carriage 2.

A hydraulic device is used for controlling the machine. The hydraulically actuated controlling elements are assembled in the control block 110. Furthermore, there are provided electrically actuated control devices which are supplied with electric energy from the main lines R and S. The operation of the control devices will be explained in the following:

Fig. 2 illustrates the machine during the execution of a working cycle. The coupling sleeve 23 is in engagement with the coupling teeth 21a of the gear 21. Therefore, the motor 16 drives by means of the shaft 17 the set of change speed gears 18, the gear 19 on shaft 20, the gear 21, the coupling sleeve 23, the shaft 22, the bevel gears 28, 29, the telescopic shaft 30, 31, the vertical shaft 32 and by means of the worm gearing 34, 9 the work spindle 8. The latter rotates by means of the driver 10 the workpiece 11. The work spindle 8 drives also by means of the four suitably selected change speed gears 35, 36, 37 and 38 the guide spindle 39. The selection of the last named change speed gears takes place in correspondence with the pitch of the thread which is to be ground onto the workpiece 11. The grinding disc 50 and the workpiece 11 rotate in the direction of the arrows inserted in Figs. 1 to 3 and the workpiece carriage 2 moves from the left to the right because in this particular instance a right hand thread is to be ground.

The bridging contact 111, Figs. 1 and 2, on the axially movable switch pin 112 of the electric switch 113 which is secured to the machine frame 1 is in engagement with the contact elements 114 and 115. In this position of the electric switch 113 an electric circuit is closed from the main line R, the line 118, the contact member 116, the line 119, the contact member 114, the bridging contact 111, the contact member 115, the line 120 which leads to the terminal 131 of the magnet coil 132, the other terminal 133 of which is connected by the line 134 with the other main line S. Therefore the magnet coil 132 is energized and in this position holds the rotatably mounted double armed lever 135 in the position in which it is shown in Fig. 2.

Furthermore, the main line R is connected by the line 136 with one terminal 137 of a magnet coil 138 and the other terminal 139 of the magnet coil 138 is connected with the main line S by the line 145, the contact member 143, the bridging contact 107 on the switch pin 108 which is in its working position, the contact member 142, the line 141, the contact member 140 and the line 121. Therefore, the magnet coil 138 is also energized and holds the double arm lever 146 in the position shown in Fig. 2.

The position of the double armed levers 135 and 146 which are connected by links 147 and 148 respectively, with control pistons 149 and 150 respectively, create the following conditions in the hydraulic control system:

Oil under pressure, which in the example of the invention shown is forced by a gear pump 151 from a reservoir $R_1$ into a line 153 over a pressure regulating valve 152, is conducted into the chamber 181 and from here through a passage 182 into the cylinder 183. The pressure in the pipe line 153 is indicated by a pressure meter 155 connected to the pipe line 153 by a branch pipe 154. The cylinder 183 has slidably mounted therein a piston 184 and the oil pressure urges this piston into its upper end position in which the piston 184 engages the cover 126. The piston 184 is provided at its lower end with a catch 122 and on its outer circumference is provided with a longitudinal groove 123 which terminates a short distance from the ends of the piston 184. A spring 125 is arranged in an axial bore 124 of the piston 184 and has the tendency to move the piston 184 downwardly, namely as soon as the pressure is released from the fluid in the cylinder 183.

The pipe line 153 supplies also oil under pressure to a branch pipe 156 which leads to the chamber 157 and from the latter the oil under pressure is conducted through a passage 158 into a chamber 159 and urges the piston 160 therein continuously toward the right. The chamber 161 on the right hand side of the piston 160 is connected by a passage 162 with the reservoir $R_1$. The piston rod 163 of the piston 160 is connected by a link 164 with the outer end of the double armed lever 24 and therefore as long as in this position of the parts the fluid in the chamber 159 is under pressure, the coupling sleeve 23 connected to the double armed lever 24 is held in operative engagement with the coupling teeth 21a of the rotating gear 21. Some of the pressure fluid in the chamber 159 is conducted by a passage 165 into the longitudinal groove 123 of the piston 184 and flows from here into the passages 127 and 128 which are connected with a cylindrical chamber 166 to hold therein the piston 167 in its upper end position. A pressure spring 168 arranged in an axial bore of the piston 167 engages with its upper end the cover 169 which closes the upper end of the chamber 166 and has the tendency to move the piston 167 continuously downwardly. The chamber 166 is also connected by a conduit 170 with the cylinder 79 and the pressure fluid entering the latter urges the feed piston 78 against the cover 81.

The passage 127 is also connected with a branch conduit 171 which conducts pressure fluid into a radial bore 172, Fig. 3, of the feed spindle bearing 57 in the machine frame 1. This radial bore 172 is connected with an annular groove in the feed spindle 55 and from this annular groove 173 the oil flows through a transverse bore 174 into an axial bore 175 of the spindle 55 to be conducted to another transverse bore 176. The latter conducts the pressure fluid into another annular groove 177 which is connected with radial bores 178 in the sleeve 59 and with an exterior annular groove 179 which latter conducts the pressure fluid to the radial bores 180 in the gear sleeve 64 and into the annular chamber 68. The pressure fluid entering the annular chamber 68 urges the feed wheel 65 axially against the annular shoulder 64b of the gear sleeve 64. At the end of the travel of the carriage 2 toward the right the adjustably mounted stop 185 on the carriage 2, Fig. 2, engages the switch pin 112 and moves the same toward the right. Thereby the bridging contact 111 carried by the switch pin 112 opens the electric circuit between the contact members 114 and 115 and shortly thereafter engages the two contact members 116 and 117. The energization of the magnet coil 132 is thereby interrupted and the magnet coil 190 will now be energized by a circuit comprising the main line R, the line 118, the contact member 116, the bridging contact 111, the contact member 117 and the line 187 which is connected to one terminal 189 of the magnet coil 190. The other terminal 191 of the magnet coil 190 is connected by the line 192 with the terminal 133 and the line 134 with the other main line S. As a result of the energization of the magnet coil 190 the double armed lever 135 executes a rotative movement in clockwise direction and moves the piston 149 toward the right. Pressure fluid from chamber 157 flows now into the passage 162 and into the chamber 161 and causes a movement of the piston 160 toward the left. This movement of the piston 160 has the result that the piston rod 163 and the link 164 connected thereto rotate the double armed lever 24 counterclockwise so that the coupling sleeve 23 is moved toward the right and comes into operative engagement with the coupling teeth 26a of the rotating gear 26. The shaft 22 is now rotated in the opposite direction by the motor 16, the shaft 17 of which drives the gears 27 and 25 and the coupling sleeve 23. When the shaft 22 in the manner described changes its direction of rotation the workpiece will also be rotated in the opposite direction and furthermore, the workpiece slide 2 moves from the right hand side toward the left hand side.

The fluid in the chamber 159 can escape into the reservoir R1 over the passage 158. Furthermore, the oil in the annular chamber 68, Fig. 3 may escape through the bores 180, the annular groove 179, the bores 178, the annular groove 177, the transverse bore 176, the axial bore 175, the transverse bore 174, the annular groove 173, the bore 172, the conduit 171, the passage 127, the longitudinal groove 123 and the passage 165 into the chamber 159 and from here over the passage 158 into the reservoir R1. During the return travel of the carriage 2 the driving connection between the two end faces 65a and 64b of the feed wheel 65 and gear sleeve 64 respectively, which was established by the pressure of the oil in the chamber 68, is released.

The oil in the chamber 166 will be ejected by the piston 167 which moves downwardly under the influence of the spring 168. The ejected oil escapes over the passage 129 into the passage 127 which in this phase of the operation leads the oil which is no longer under pressure toward the reservoir R1.

The feed piston 78 moves now under the influence of the spring 80 toward the left, Fig. 4, until the piston 78 engages the end face 82a of the abutment screw 82. The oil in the cylinder 79 will be ejected into the conduit 170, and into the branch conduit 183 into the upper end of the chamber 166 which by means of a drain passage 195 is connected with the reservoir R1. The feed piston 78 is moved toward the left a distance H, Fig. 4, which represents the feed movement of the tool for one pass. The rack 78l on the feed piston 78 rotates the feed gear 65 a corresponding amount. However, it should be noted that during this rotative movement of the feed wheel 65 the adjacent gear sleeve 64 and spur gear 66 will not be rotated but remain stationary because of the action of the brake 71 and 74 which prevents any rotation of the last named parts.

At the end of the return movement of the carriage 2 another adjustably mounted stop 196 on the latter engages the switch pin 112 and moves the latter towards the left whereby the bridging contact 111 comes again in contact with the contact members 114 and 115. The energization of the magnet coil 190 is thereby interrupted, while the magnet coil 132 is again energized by the circuit previously described. The double armed lever 135 will be rotated counterclockwise, moves the piston 149 towards the left, and pressure fluid enters the passage 158 from the chamber 157 to fill the chamber 159 and to move the piston 160 therein toward the right. The double armed lever 24 rotates clockwise and moves the coupling sleeve 23 towards the left into operative engagement with the coupling teeth 21a of the gear 21, while at the same time the operative engagement of the sleeve 23 with the gear 26 is broken. The carriage 2 again changes its direction of travel and moves again from the left toward the right. The oil in chamber 161 escapes over the passage 162 into the reservoir R1.

The oil pressure necessary to move the piston 160 is, however, not sufficient to move the piston 167 upwardly, which piston in this phase of the operation of the machine is held by the spring 168 in its lower end position. However, oil under pressure from the chamber 159 is conducted into the annular chamber 68 by means of the passage 165, the axial groove 123, the passage 127, the branch conduit 171, bore 172, annular groove 173, transverse bore 174, axial bore 175, transverse bore 176, annular groove 177, bores 178, annular groove 179 and the bores 180. Therefore, the feed wheel 65 is again drivingly clamped with its end face 65a, Fig. 3, against the end face 64b of the gear sleeve 64. Only then, when the piston 160 has completed its movement toward the right end the feed wheel 65 engages completely the gear sleeve 64 and an increase in the oil pressure takes place. Thereupon, the piston 167 moves upwardly and oil under pressure from the chamber 166 enters the conduit 170 and the cylinder 79. Now the feed piston 78 is moved toward the right until it engages the cover 81.

During this movement of the feed piston 78 towards the right the rack 78l on the piston 78 rotates the feed gear 65 counter-clockwise, Figs. 2 and 4. Since there is established between the feed gear 65 and the gear sleeve 64 a driving connection which was already present prior to the beginning of the feed movement of the piston 78 there will now be effected a rotative movement of the gear sleeve 64 and of the spur gear 66 in unison with the feed gear 65. The axial pressure exerted by the oil under pressure within the annular chamber 68 is substantially greater than the circumferential braking power of the brake 71, 74. The rotative movement of the gear sleeve 64 in counter-clockwise direction has the result that by means of the thread 59l there is effected a longitudinal movement of the sleeve 59 forwardly, that is, toward the workpiece. Accordingly, the axial bearing 69 and the radial face 55a on the collar 55a and therewith the entire feed spindle 55 with the nut 56 on the tool carriage 44 with the grinding disc 50 thereon is moved closer toward the workpiece 11.

During the rotative movement of the gear sleeve 64 the gear teeth 641 thereon move the rack 751 and therewith the return piston 75 toward the right, Figs. 2 and 6. Furthermore, the stop 91, Fig. 7, moves toward its end position about an angle $\gamma$, which angle corresponds to the feed movement H of the feed piston 78. The gear 92 which meshes with the gear 66 is rotated by the latter in clockwise direction and the shaft 93 and the drum 96 with the two dogs 98 and 99 thereon rotate in the same direction. The dog 98 moves about the angle $\delta$ and moves toward the stationary stop 100. The angle $\delta$ corresponds to the feed distance H of the feed piston 78.

The alternation between the working travel and the return travel of the carriage 2 and the succession of the feed movements of the tool carriage 44 takes place in the described manner until the end of the last but one return travel of the carriage 2. During each feed movement of the tool the feed piston 78 moves the adjusted feed distance H from left to right and the stop 91 and the dog 98 respectively, move closer to the end position about their corresponding angles $\gamma$ and $\delta$.

At the end of the last but one return travel the dog 98 is spaced from the stationary stop 100 an angle $\epsilon$ which angle is smaller or at any rate not larger than the angle $\delta$. In order to produce on the workpiece 11 a thread of the desired depth $t$, Fig. 3, it is necessary in the above described example that the next feed movement be smaller than the preceding feed movements. This requirement will be accomplished automatically by the feed device of the present invention in that at the beginning of the last working pass the feed piston 78 does not execute the complete feed distance H which has been adjusted by the adjusting device 84, 88, 90 but is only moved a distance $h$ which corresponds to the angle $\epsilon$. When the dog 98 engages the stationary stop 100 the desired depth $t$ of the thread has been obtained. The stationary stop 100 prevents any further rotation of the drum 96, the shaft 93, the gears 92, 66, the gear sleeve 64 and feed gear 65. The movement of the feed piston 78 is stopped and the latter is maintained in this arrested position before it can reach the cover 81.

The last feed movement is the result of conditions as they are encountered after the last but one return travel has been completed and the balance of the feed movement still to be executed will be accurately the difference between the desired depth of the thread and the depth of the thread already produced.

During the last feed movement the stop 91 on the spur gear 66 has been rotated about the angle $\zeta$ in counter-clockwise direction and is positioned now also in its end position. At the end of this rotative movement the stop 91 engages the double armed lever 103 and rotates the same clockwise. Thereby the lever arm 1032 is removed from the projection 1061 and the inclined face 1033 moves the switch pin 108 forwardly, Fig. 3. The bridging contact 107 moves away from the contact members 142 and 143 and engages the contact members 140 and 144 and the result is that the magnet coil 138 is deenergized. However, there is now established a conductive connection between the main line S and the terminal 198 of the magnet coil 199 as follows:

The main line S, the line 121, the contact member 140, the bridging contact 107, the contact member 144, and the line 197. The magnet coil 199 will not as yet be energized because there is still no connection of the terminal 200 with the main line R. The double armed lever 146 and the control piston 150 connected therewith remain at present in their present position. At the end of the last working pass, however, the stop 185 moves the switch pin 112 toward the right. Thereby the bridging contact 111 is disengaged from the two contact members 114 and 115 and thereby the magnet coil 132 becomes deenergized. The bridging contact 111, however, engages now the contact members 116 and 117 and a circuit is closed which energizes the magnet coil 190. The result of this actuation of the switch pin 112 carrying the bridging contact 111 has been described in all its details previously and, therefore, is repeated in the following only briefly. Upon energization of the magnet coil 190 the double armed lever 135 is rotated in clockwise direction and moves the piston 149 toward the right. As a consequence the piston 160 moves toward the left and rotates the double armed lever 24 anti-clockwise so that the coupling sleeve 23 moves in operative engagement with the coupling teeth 26a of the gear 26 and thereby the direction of travel of the carriage 2 is reversed. At the same time the rigid connection between the feed wheel 65 and the gear sleeve 64 is released because the oil in the annular chamber 68 can drain off. Furthermore, the piston 78 whose rack 781 engages the feed gear 65 moves toward the left until it engages the end face 823 of the abutment screw 82 and thereby the feed gear 65 is rotated clockwise.

As soon as the bridging contact 111 engages the contact members 116 and 117 the magnet coil 199 is also energized because a circuit is completed including the main line R, the line 118, the contact member 116, the bridging contact 111, the contact member 117, the line 187, the branch line 201, the terminal 200, the coil 199, the terminal 198, the line 197, the contact member 144, the bridging contact 107, the contact member 140 and the line 121 which leads to the other main line S. Accordingly the double armed lever 146 is also rotated in clockwise direction and by means of the link 148 moves the piston 150 toward the right. Oil under pressure flows now from chamber 181 into the conduit 202 and into the cylinder 76, Figs. 2 and 6. The return piston 75 is now actuated by the oil under pressure and moves at once toward the left and thereby rotates with its rack teeth 751 the gear sleeve 64, Fig. 3. The gear 66 which is keyed to this gear sleeve 64 rotates also and drives the gear 92, the shaft 93 and the drum 96. The gear sleeve 64 and the gear 66 thereon rotate in clockwise direction and under the influence of the weight 54 and the left handed thread 591 the sleeve 59, the feed spindle 55 and the tool carriage 44 are axially displaced in a direction rearwardly, that is, away from the workpiece 11. The gear 92, the shaft 93 and the drum 96 rotate counter-clockwise. As soon as the dog 99 engages the left side of the stationary stop 100 any further movement of the piston 75 and the parts driven by the same is arrested. The dog 98 is now again in the same position as at the beginning of the working operation and also the stop 91 on the gear 66 has assumed its initial position and, of course, the tool slide 44 has also been returned to its starting position.

At the beginning of the rearward movement of the tool carriage 44 the stop 91 has disengaged the lever arm 1031 and the tension spring 105, Fig. 7, rotates the lever 103 into its initial position in which the lever arm 1032 engages the projection 1061. The switch pin 108, however remains in its forward position in which the bridging contact 107 engages the two contact members 140 and 144.

The oil in the cylinder 183 is ejected through the passage 182 by means of the piston 184 which is forced downwardly by the spring 125.

When the workpiece carriage 2 during its return travel reaches its left hand end position the stop 196 actuates the switch pin 112 and connects the bridging contact 111 with the contact members 114 and 115 so that in a manner already described the magnet coil 132 is energized. The piston 149 is thereby moved toward the left and oil under pressure enters the chamber 159 and moves the piston 160 therein toward the right. As soon as the piston 160 reaches a central position within its chamber the catch 122 on the lower end of the piston 184 enters a notch 129 in the piston 160 and stops its travel toward the right. Accordingly, the lever 24 remains in its center position in which the coupling sleeve 23 is completely out of engagement with either one of the two gears 21 and 26. It is obvious that in this position of the coupling sleeve 23 the change speed gearing driven by the motor 16 is unable to transmit a rotative movement to the shaft 22. The workpiece 11 and the guide spindle 39 stand still and the workpiece carriage 2 remains in its left hand end position.

The passage 165 connected with the chamber 159 is filled with oil under pressure but in this position of the piston 160 this oil is unable to enter the annular chamber 68 and the cylinder 79 of the feed device because the piston 184 is in its lower end position in which the passage 127 is closed.

In this position of the machine tool the finished workpiece 11 is removed and is replaced by another workpiece to be worked upon. The machine tool is started again for performing another working process by moving the push button 130 on the switch pin 108 inwardly. In doing this the bridging contact 107 is brought into engagement with the two contact members 142 and 143 and thereby a circuit is closed which contains the main line S, the line 121, the contact member 140, the line 141, the contact member 142, the bridging contact 107, the contact member 143, the line 145, the terminal 139, the magnet 138, the terminal 137 and the line 136 which is directly connected with the main line R. The magnet coil 138 is thereby energized. The lines leading to the terminals 198 and 200 of the magnet coil 199, however, are not energized by the main line S because the contact members 140 and 144 are not connected with each other. The double armed lever 146 is rotated counter-clockwise and piston 150 moves toward the left. As soon as this movement of the piston 150 is completed the oil in the cylinder 76 may drain off through the conduit 202. At the same time oil under pressure enters the cylinder 183 through the passage 182, the piston 184 is moved upwardly and the catch 122 is withdrawn from the notch 129 of the piston 160 and now the two passages 165 and 127 are again in communication with each other.

Since the chamber 159 is under pressure the piston 160 can now complete its movement toward the right and this has the result that the coupling sleeve 23 is coupled with the gear 21 and now the work piece carriage 2 starts immediately to travel toward the right, that is, it executes its working travel. At the same time the feed of the tool is initiated as has already been described previously. First of all the feed gear 65 is pressed by the fluid under pressure in the annular chamber 68 against the annular shoulder 646 of the feed gear sleeve 64. Then the piston 167, Fig. 2, moves upwardly and thereafter the feed piston 78 is moved toward the right which has the result that the sleeve 59 and the feed spindle 55 are moved longitudinally toward the right, Fig. 3, in order to move the tool carriage 44 toward the workpiece 11. During this feed movement the dog 98 moves through an angle δ and the stop 91 moves through an angle γ toward their respective end positions.

From the foregoing it will be apparent that the automatic feed device of the invention is operatively associated with a conventional rotatable feed spindle which is in threaded engagement with a nut on the tool carriage, but that the automatic feed device does not interfere with the manual adjustment of the tool carriage when the feed spindle is rotated. The automatic feed device performs solely an axial displacement of the feed spindle without rotating the same. The total amount of feed to be performed by the automatic feed is adjustable and is determined by the position of the two dogs 98 and 99 on the drum 96. Furthermore, the individual steps or subdivisions of the total amount of automatic feed are also adjustable by the manual operable device 84, 88. The individual steps need not be uniform, but may be manually changed by adjusting the abutment screw 82 during the operation of the machine tool, with the exception of the last step whose amount is determined by the dog 98 on the drum 96.

What I claim is:

1. In a machine tool, in combination, a frame, means for supporting and rotating a workpiece lengthwise of said frame between centers, said means including a carriage reciprocable lengthwise of said frame; a tool carriage slidably supported in said frame and movable transversely with respect to said workpiece supporting carriage, a tool mounted on said tool carriage, and transverse feed means for said tool carriage adapted to produce a predetermined total amount of feed of the tool carriage in at least two steps, said last named transverse feed means including means for adjusting the transverse feed movement of the tool carriage to a fixed fractional amount of the total feed at the start of each pass of the workpiece past said tool with the exception of the last one, said transverse feed means being also provided with means for automatically adjusting the transverse feed required for the last one of the steps in such a manner that the desired predetermined total amount of the feed of the tool carriage is accurately obtained.

2. In a machine tool, in combination, a frame, a carriage reciprocable lengthwise of the frame and having means thereon for supporting and rotating a workpiece lengthwise of said frame, a tool carriage slidably supported in said frame and movable transversely with respect to said first mentioned carriage, a transverse feed means for said tool carriage adapted to produce a predetermined total amount of feed of the tool carriage in at least two working passes of said first named carriage, hydraulically operated and electrically controlled means for actuating said transverse feed means at the end of each lengthwise movement of said workpiece carriage, said transverse feed means including means for adjusting the transverse feed movement of the tool carriage to a selectively fixed fractional amount of the total feed at the start of each of said working passes with the exception of the last one, said transverse feed means being also provided with means for automatically adjusting the transverse feed required for the last one of said working passes in such a manner that the desired predetermined total amount of feed of the tool carriage is accurately obtained, and manually operating means for adjusting the individual fractional transverse feed movements of the tool carriage, said manually operable means being associated with means for limiting the movement of said hydraulically operated means when it actuates said transverse feed means for execution of the last one of said working passes.

3. In a machine tool, in combination, a frame, a carriage reciprocable lengthwise of the frame and having means thereon for supporting and rotating a workpiece lengthwise of said frame, a tool carriage slidably supported in said frame and movable transversely with respect to said first mentioned carriage, a transverse feed means for said tool carriage adapted to produce a predetermined total amount of feed of the tool carriage in at least two working passes of said first named carriage, hydraulically operated and electrically controlled means for actuating said transverse feed means at the end of each lengthwise movement of said workpiece carriage, said transverse feed means including a feed spindle attached to said tool carriage, a sleeve supported non-rotatably, but axially movable in said frame and in which said feed spindle is rotatably mounted, collar means fixed on said feed spindle, means for urging said feed spindle in axial direction in which said collar means engages one end of said sleeve, a gear sleeve in threaded engagement with the exterior circumference of said axially movable sleeve, an abutment on said frame against which one end of said gear sleeve is urged to prevent it against axial movement, a feed gear rotatably mounted on said gear sleeve and engaging with one of its ends an annular shoulder formed on said gear sleeve, a hydraulic cylinder extending transversely to said feed spindle, a reciprocable piston in said hydraulic cylinder and having rack teeth engaging said gear to rotate the same when said piston is reciprocated, hydraulic means operatively connected with said hydraulic cylinder and acting axially upon said feed gear to urge the same against said annular shoulder of said gear sleeve to cause the latter to rotate with said feed gear in a direction in which the sleeve on said feed spindle is axially moved to feed the latter and therewith the tool carriage toward the workpiece a distance which is a fraction of the total amount of said predetermined feed, manually operable means for adjusting the length of the stroke of said piston, thereby determining the individual fractional transverse feed movements of said tool carriage, said manually operable means being associated with means for limiting the movement of said piston when the latter actuates the feed gear and therewith the gear sleeve and the feed spindle for the execution of the last one of said working passes.

4. In a machine tool, in combination, a frame, a carriage reciprocable lengthwise of the frame and having means thereon for supporting and rotating a workpiece lengthwise of said frame, a tool carriage slidably supported in said frame and movable transversely with respect to said first mentioned carriage, a transverse feed means for said tool carriage adapted to produce a predetermined total amount of feed of the tool carriage in at least two working passes of said first named carriage, hydraulically operated and electrically controlled means for actuating said transverse feed means at the end of each lengthwise movement of said workpiece carriage, said transverse feed means including a feed spindle attached to said tool carriage, a sleeve supported non-rotatably, but axially movable in said frame and in which said feed spindle is rotatably mounted, collar means fixed on said feed spindle, means for urging said feed spindle in axial direction in which said collar means engages one end of said sleeve, a gear sleeve in threaded engagement with the exterior circumference of said axially movable sleeve, an abutment on said frame against which one end of said gear sleeve is urged to prevent it against axial movement, a feed gear rotatably mounted on said gear sleeve and engaging with one of its ends an annular shoulder formed on said gear sleeve, a hydraulic cylinder extending transversely to said feed spindle, a reciprocable piston in said hydraulic cylinder and having rack teeth engaging said feed gear to rotate the same when said piston is reciprocated, hydraulic means operatively connected with said hydraulic cylinder and acting axially upon said feed gear to urge the same against said annular shoulder of said gear sleeve to cause the latter to rotate with said feed gear in a direction in which the sleeve on said feed spindle is axially moved to feed the latter and therewith the tool carriage toward the workpiece a distance which is a fraction of the total amount of said predetermined feed, and manually adjustable means for presetting the total transverse feed of said tool carriage including a rotatable stop disc provided with two angularly spaced and angularly adjustable stops, a fixed stop on said frame adapted to be engaged by said adjustable stops on said stop disc at the beginning of the first working pass and at the end of the last working pass respectively, and a geared connection between said gear sleeve and said rotatable stop disc, whereby the latter is rotated whenever the gear sleeve is rotated by said feed gear.

5. In combination with a manually rotatable feed spindle which is in screw threaded engagement with a tool carriage slidably mounted in a frame, an automatically operable feed means adapted to produce a predetermined amount of feed of the tool carriage in at least two separate feed steps, said feed means including a sleeve supported non-rotatably, but axially movable in said frame, said feed spindle being rotatably mounted in said sleeve, collar means fixed on said feed spindle, means for urging said feed spindle in axial direction in which said collar means engages one end of said sleeve, a gear sleeve in screw threaded engagement with an enlarged exterior portion of said axially movable sleeve, an abutment on said frame against which one end of said gear sleeve is urged to prevent an axial movement of the latter, a feed gear rotatably mounted on a smooth cylindrical portion of said gear sleeve and engaging with one of its ends an annular shoulder formed on said gear sleeve, a hydraulic cylinder extending transversely to said feed spindle, a reciprocable piston in said hydraulic cylinder and having rack teeth engaging said feed gear to rotate the same when said piston is reciprocated, hydraulic means operatively connected with said hydraulic cylinder and acting axially upon said feed gear to urge the same against said annular shoulder of said gear sleeve to cause the latter to rotate with said feed gear in a direction in which the sleeve on said feed spindle is axially moved to feed the latter and therewith the tool carriage a distance which is a fraction of the total amount of said predetermined feed, manually operable means for adjusting the length of the stroke of the feed piston to thereby determine the length of the individual feed movements of said tool carriage, said manually operable means being associated with means for limiting the movement of said piston when the latter actuates the feed gear and therewith the gear sleeve and the feed spindle during the execution of the last one of the fractional portions of the total feed.

6. In a grinding machine, in combination, a frame, means for supporting and rotating a workpiece lengthwise of said frame between centers, said means including a carriage reciprocable lengthwise of said frame; a tool carriage slidably supported in said frame and movable transversely with respect to said workpiece supporting carriage, a grinding wheel and means for driving the same on said tool carriage, and transverse feed means for said tool carriage adapted to produce a predetermined total amount of feed of the tool carriage in at least two grinding passes, said last named transverse feed means including means for adjusting the transverse feed movement of the tool carriage to a fixed fractional amount of the total feed at the start of each of the said grinding passes with the exception of the last one, said transverse feed means being also provided with means for automatically adjusting the transverse feed required for the last one of said grinding passes in such a manner that the desired predetermined total amount of feed of the tool carriage is accurately obtained.

7. In a grinding machine, in combination, a frame, means for supporting and rotating a workpiece lengthwise of said frame between centers, said means including a carriage reciprocable lengthwise of said frame; a tool carriage slidably supported in said frame and movable transversely with respect to said workpiece supporting carriage, a grinding wheel and means for driving the same on said tool carriage, and transverse feed means for said tool carriage adapted to produce a predetermined total amount of feed of the tool carriage in at least two grinding passes, hydraulically operated and electrically controlled means for actuating said transverse feed means at the end of each lengthwise movement of said workpiece carriage, said last named transverse feed means including means for adjusting the transverse feed movement of the tool carriage to a selectively fixed fractional amount of the total feed at the start of each of said grinding passes with the exception of the last one, said transverse feed means being also provided with means for automatically adjusting the transverse feed required for the last one of said grinding passes in such a manner that the desired predetermined total amount of feed of the tool carriage is accurately obtained, and manually operated means for adjusting the individual fractional transverse feed movements of said tool carriage, said manually operable means being associated with means for limiting the movement of said hydraulically operated means when it actuates said transverse feed means for execution of the last one of said grinding passes.

8. In a grinding machine, in combination, a frame, means for supporting and rotating a workpiece lengthwise of said frame between centers, said means including a carriage reciprocable lengthwise of said frame, a tool carriage slidably supported in said frame and movable transversely with respect to said workpiece supporting carriage, a grinding wheel and means for driving the same on said tool carriage, and transverse feed means for said tool carriage adapted to produce a predetermined total amount of feed of the tool carriage in at least two grinding passes, said transverse feed means including a feed spindle attached to said tool carriage, a sleeve supported non-rotatably, but axially movable in said frame and in which said feed spindle is rotatably mounted, collar means fixed on said feed spindle, means for urging said feed spindle in axial direction in which said collar means engages one end of said sleeve, a gear sleeve in threaded engagement with the exterior circumference of said axially movable sleeve, an abutment on said frame against which one end of said gear sleeve is urged to prevent it against axial movement, a feed gear rotatably mounted on said gear sleeve and engaging with one of its ends an annular shoulder formed on said gear sleeve, a hydraulic cylinder extending transversely to said feed spindle, a reciprocable piston in said hydraulic cylinder and having rack teeth engaging said feed gear to rotate the same when said piston is reciprocated, hydraulic means operatively connected with said hydraulic cylinder and acting axially upon said feed gear to urge the same against said annular shoulder of said gear sleeve to cause the latter to rotate with said feed gear in a direction in which the sleeve on said feed spindle is axially moved to feed the latter and therewith the tool carriage toward the workpiece a distance which is a fraction of the total amount of said predetermined feed, manually operable means for adjusting the length of the stroke of said piston, thereby determining the individual fractional transverse feed movements of said tool carriage, said manually operable means being associated with means for limiting the movement of said piston when the latter actuates the feed gear and therewith the gear sleeve and the feed spindle for the execution of the last one of said grinding passes.

9. In a grinding machine, in combination, a frame, means for supporting and rotating a workpiece lengthwise of said frame between centers, said means including a carriage reciprocable lengthwise of said frame, a tool carriage slidably supported in said frame and movable transversely with respect to said workpiece supporting carriage, a grinding wheel and means for driving the same on said tool carriage, and transverse feed means for said tool carriage adapted to produce a predetermined total amount of feed of the tool carriage in at least two grinding passes, said transverse feed means including a feed spindle attached to said tool carriage, a sleeve supported non-rotatably, but axially movable in said frame and in which said feed spindle is rotatably mounted, collar means fixed on said feed spindle, means for urging said feed spindle in axial direction in which said collar means engages one end of said sleeve, a gear sleeve in threaded engagement with the exterior circumference of said axially movable sleeve, an abutment on said frame against which one end of said gear sleeve is urged to prevent it against axial movement, a feed gear rotatably mounted on said gear sleeve and engaging with one of its ends an annular shoulder formed on said gear sleeve, a hydraulic cylinder extending transversely to said feed spindle, a reciprocable piston in said hydraulic cylinder and having rack teeth engaging said feed gear to rotate the same when said piston is reciprocated, hydraulic means operatively connected with said hydraulic cylinder and acting axially upon said feed gear to urge the same against said annular shoulder of said gear sleeve to cause the latter to rotate with said feed gear in a direction in which the sleeve on said feed spindle is axially moved to feed the latter and therewith the tool carriage toward the workpiece a distance which is a fraction of the total amount of said predetermined feed, and manually adjustable means for presetting the total transverse feed of said tool carriage including a rotatable stop disc provided with two angularly spaced and angularly adjustable stops, a fixed stop on said frame adapted to be engaged by said adjustable stops on said stop disc at the beginning of the first grinding pass and at the end of the last grinding pass respectively, and a geared connection between said gear sleeve and said rotatable stop disc, whereby the latter is rotated whenever the gear sleeve is rotated by said feed gear.

10. In a grinding machine, in combination, a frame, means for supporting and rotating a workpiece lengthwise of said frame between centers, said means including a carriage reciprocable lengthwise of said frame, a tool carriage slidably supported in said frame and movable transversely with respect to said workpiece supporting carriage, a grinding wheel and means for driving the same on said tool carriage, a feed spindle, one end of which having a threaded portion which is in threaded engagement with said tool carriage while the other end of said feed spindle has a hand wheel fixedly attached thereto, and an automatically operable transverse feed means for said tool carriage adapted to produce a predetermined total amount of feed of the tool carriage in at least two grinding passes, said automatically operable transverse feed means including said feed spindle, a sleeve supported non-rotatably, but axially movable in said frame and which supports said feed spindle rotatably between its ends, collar means fixed in said feed spindle, means for urging said feed spindle in axial direction in which said collar means engages one end of said sleeve, a gear sleeve in threaded engagement with the exterior circumference of said axially movable sleeve, an abutment in said frame against which one end of said gear sleeve is urged to prevent it against axial movement, a feed gear rotatably mounted on said gear sleeve and engaging with one of its ends an annular shoulder formed on said gear sleeve, a hydraulic cylinder extending transversely to said feed spindle, a reciprocable piston in said hydraulic cylinder and having rack teeth engaging said feed gear to rotate the same when said piston is reciprocated, hydraulic means operatively connected with said hydraulic cylinder and acting axially upon said feed gear to urge the same against said annular shoulder of said gear sleeve to cause the latter to rotate with said feed gear in a direction in which the sleeve on said feed spindle is axially moved to feed the latter and therewith the tool carriage toward the workpiece a distance which is a fraction of the total amount of said predetermined feed, manually operable means for adjusting the length of the stroke of said piston, thereby determining the individual fractional transverse feed movements of said tool carriage, said manually operable means being associated with means for limiting the movement of said piston when the latter actuates the feed gear and therewith the gear sleeve and the feed spindle for the execution of the last one of said grinding passes.

11. In a grinding machine, in combination, a frame, means for supporting and rotating a workpiece lengthwise of said frame between centers, said means including a carriage reciprocable lengthwise of said frame, a tool carriage slidably supported in said frame and movable transversely with respect to said workpiece supporting carriage, a grinding wheel and means for driving the same on said tool carriage, a feed spindle, one end of which having a threaded portion which is in threaded engagement with said tool carriage while the other end of said feed spindle has a hand wheel fixedly attached thereto, and an automatically operable transverse feed means for said tool carriage adapted to produce a predetermined total amount of feed of the tool carriage in at least two grinding passes, said automatically operable transverse feed means including said feed spindle, a sleeve supported non-rotatably but axially movable in said frame and which supports said feed spindle rotatably between its ends, collar means on said feed spindle, means for urging said feed spindle in axial direction in which said collar means engages one end of said sleeve, a gear sleeve in threaded engagement with the exterior circumference of said axially movable sleeve, an abutment in said frame against which one end of said gear sleeve is urged to prevent it against axial movement, a feed gear rotatably mounted on said gear sleeve and engaging with one of its ends an annular shoulder formed on said gear sleeve, a hydraulic cylinder extending transversely to said feed spindle, a reciprocable piston in said hydraulic cylinder and having rack teeth engaging said feed gear to rotate the same when said piston is reciprocated, hydraulic means operatively connected with said hydraulic cylinder and acting axially upon said feed gear to urge the same with pressure against said annular shoulder of said gear sleeve to cause the latter to rotate with said feed gear in a direction in which the sleeve on said feed spindle is axially moved to feed the latter and therewith the tool carriage toward the workpiece a distance which is a fraction of the total amount of said predetermined feed, manually operable means for adjusting the length of the stroke of said piston, thereby determining the individual fractional transverse feed movements of said tool carriage, and manually adjustable means for presetting the total transverse feed of said tool carriage including a rotatable stop disc provided with two angularly spaced and angularly adjustable stops, a fixed stop on said frame adapted to be engaged by said adjustable stops on said stop disc at the beginning of the first grinding pass and at the end of the last grinding pass respectively, and a geared connection between said gear sleeve and said rotatable stop disc, whereby the latter is rotated whenever the gear sleeve is rotated by said feed gear.

12. In a grinding machine according to claim 11, including brake means engaging said gear sleeve for preventing rotation of the same when said feed gear after execution of its feed stroke changes its direction of rotation.

13. In a grinding machine according to claim 11, including brake means engaging said gear sleeve for preventing rotation of the same when said feed gear after execution of its feed stroke changes its direction of rotation, and means for releasing the pressure of said hydraulic means acting upon said feed gear when the piston operatively connected to said feed gear is returning to its initial position.

14. In a grinding machine according to claim 11, including a second hydraulic cylinder arranged parallel to said first mentioned hydraulic cylinder, a reciprocable piston in said second hydraulic cylinder and having rack teeth thereon meshing with gear teeth on said gear sleeve, and means operated by said geared connection at the end of the last grinding pass for admitting pressure fluid to said second hydraulic cylinder to move the piston therein in a direction in which the gear sleeve is rotated to return the feed spindle and the automatically operable feed means to starting position.

ALFRED RICKENMANN.

REFERENCES CITED

The following references are of record in the file of this patent:

UNITED STATES PATENTS

| Number | Name | Date |
|--------|------|------|
| 1,553,522 | Durkee | Sept. 15, 1925 |